FLUID ACTUATED ROTARY TOOL

Original Filed Nov. 4, 1953

Fred McFadden
Inventor

By Jack M. Wiseman
Attorney

United States Patent Office

Re. 24,391
Reissued Nov. 12, 1957

24,391

FLUID ACTUATED ROTARY TOOL

Fred McFadden, Chicago, Ill.

Original No. 2,732,671, dated January 31, 1956, Serial No. 390,225, November 4, 1953. Application for reissue January 30, 1957, Serial No. 639,597

10 Claims. (Cl. 51—170)

Matter enclosed in heavy brackets [ ] appears in the original patent but forms no part of this reissue specification; matter printed in italics indicates the additions made by reissue.

The present invention relates in general to fluid actuated tools and more particularly to a fluid actuated tool of the portable rotary type.

Heretofore, in fluid actuated rotary tools, the rotor thereof has been mounted on the upper portion of the chamber or fluid tube in close relationship to the intake valve. Therefore, the axis of rotation of the rotor was in direct alignment with the central axis of the tubular housing and air chamber thereof. Further, a cutting implement, commonly known as the cutter or grinder, had the axis of rotation thereof also in alignment with the central axis of the tubular housing and chamber.

Accordingly, an important object of the present invention is to provide a fluid actuated rotary tool having the rotating axis of a work engaging implement perpendicular to the longitudinal axis of a housing and chamber.

Another object of the present invention is to provide a fluid actuated rotary tool having a rotor or turbine thereof at the lowermost extremity of a housing and chamber to provide a pendulum balance to minimize vibrations.

Another object of the present invention is to provide a fluid actuated rotary tool having a rotor or turbine thereof at the head of the tool and in close relationship to a work engaging implement, to enable the operator to place and swing the work engaging implement in small cavities or impressions.

Another object of the present invention is to provide a fluid actuated rotary tool having the axis of rotation of a rotor or turbine thereof perpendicular to the central longitudinal axis of a housing and chamber to provide a simplified and inexpensive tool without sacrificing efficiency, durability or ease of operation.

Other objects and features will appear upon further perusal of the detailed description taken in conjunction with the accompanying drawing in which.

Figure 2:
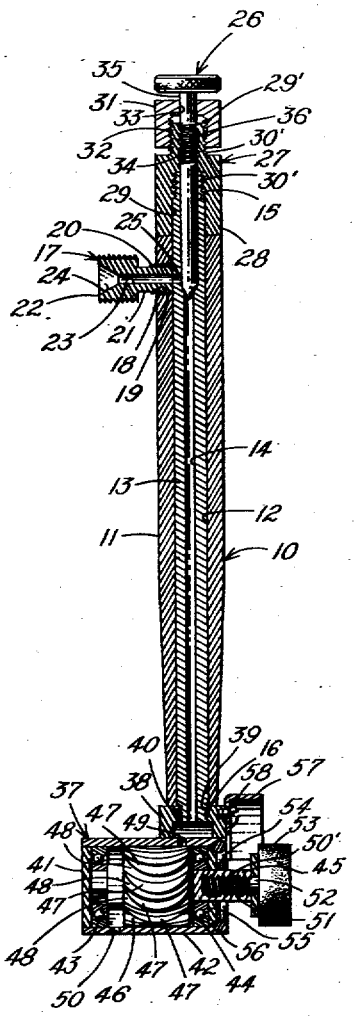
Figure 2 is a central longitudinal sectional view, partly in elevation, taken substantially along line 2—2 of Figure 1.

Briefly described, a fluid actuated rotary tool is herein provided comprising a suitable tubular housing having a bore therethrough. The tubular housing provides an elongated handle by means of which the tool is manipulated.

For providing an air passage throughout the entire length of the tubular housing, a suitable fluid tube or chamber is provided, which is received by the bore of the tubular housing. The fluid tube or chamber is provided with a suitable narrow passage duct or communicating chamber for receiving the driving fluid, which in the preferred embodiment is air.

To provide a supply of fluid or air intake, a suitable nipple is received by a threaded section at one extremity of the tubular housing and has a duct therein communicating or registering with the air tube or fluid chamber.

In order to control the fluid flow, a suitable needle valve is mounted at said one extremity of the tubular housing and has a needle therein movably adjustable to control fluid flow. A suitable housing cap section is mounted at said one extremity of the tubular housing and encompasses the needle valve.

According to the invention, a work engaging implement such as a grinder or cutter is mounted on the other extremity of the tubular housing and fluid chamber, and has a central rotating axis perpendicular to the longitudinal or central axis of the tubular housing.

For supporting and rotating the work engaging implement, a rotor shaft is provided having suitable means such as a threaded section to receive the cooperating extension of the work engaging implement.

In order to rotate the rotor shaft for rotating the work engaging implement, a circular rotor or turbine wheel is provided and has a bore therethrough to receive the rotor shaft, which is fixedly secured to the rotor. The circular rotor or turbine wheel is mounted at said other extremity of the tubular housing and has the central rotating axis thereof perpendicular to the longitudinal or central axis of the tubular housing and fluid chamber. The circular rotor or turbine wheel, in the preferred embodiment, is constructed with integrally formed radial vanes or teeth upon its periphery, which extend from one end face to the opposite end face of the rotor and are disposed with arcuate configurations concentric with the axis of the rotor. Each tooth or vane has maximum width at the midway point of the opposite faces of the rotor and gradually decreases in width as the extremities of the tooth approach the opposite faces to provide a configuration similar in shape to a quarter moon. Ridges or spaces are provided between the vanes or teeth to permit passage of the fluid and to enable rotation by fluid pressure.

The rotor shaft, therefore, supports both the fixedly attached circular rotor and the work engaging implement. For supporting the rotatable rotor shaft suitable ball bearings are provided. The ball bearings are housed by a rotor or drive housing, which is secured to said other extremity of the tubular housing. The rotor or drive housing, which has the turbine wheel or circular rotor contained therein, has an air intake duct or port therein which communicates or registers with the air chamber to permit fluid pressure to actuate the circular rotor or turbine wheel. In addition thereto, a suitable exhaust duct or port is provided in the drive housing and communicates with the fluid that has actuated the rotor to permit the fluid to discharge into the outside atmosphere.

Accordingly, at one extremity of the tubular housing is mounted the cap section, intake nipple and the needle valve. At the opposite extremity of the tubular housing is mounted the drive housing encompassing the circular rotor or turbine wheel. Secured to the rotor is the drive shaft which rotates the work engaging implement. Communicating or registering therebetween is the air tube or chamber. Therefore, the circular rotor or turbine wheel has the central axis thereof perpendicular to the longitudinal axis of the tubular housing and similarly the central axis of the work engaging implement is perpendicular to the central longitudinal axis of the tubular housing.

Figure 1:
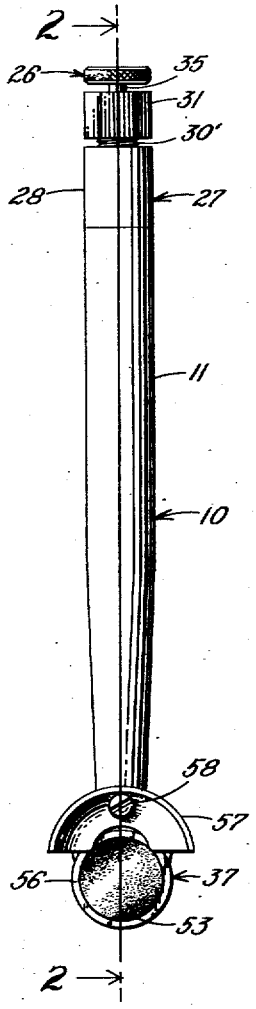
Figure 1 is an elevational view of the fluid actuated rotary tool embodies in the present invention.

Referring to Figures 1 and 2 for a more detailed description, a fluid actuated rotary tool 10 is herein provided comprising a suitable tubular housing 11 having a longitudinal bore 12 therethrough. The tubular housing 11 provides an elongated handle by means of which the tool 10 is manipulated.

In order to provide a narrow passage for the fluid under pressure throughout the entire length of the tubular housing, a suitable communicating chamber or fluid tube 13 is received by the bore 12. The communicating chamber or fluid tube 13 has a longitudinal fluid passageway 14 therethrough, which extends throughout the entire length of the tubular housing 11. The upper portion of the communicating chamber 13 is provided with suitable exterior threads 15 and the lower portion thereof is provided with suitable exterior threads 16.

In order to provide a supply of fluid or air intake, a suitable nipple section or fluid delivery section 17 is provided. The tubular housing 11 has a bore 18 therein surrounded by threads 19 which receive exterior threads 20 on a stem 21 of the nipple section 17. The cooperation between the threads 19 and 20 secures the nipple section 17 to the tubular housing 11. An increased diameter portion 22 on the stem 21 provides the air connector securing means for the nipple section 17. The stem 21 has a bore 23 and a counterbore 24 therethrough to provide a communicating or registering passage with the air communicating tube 13. For this purpose, a suitable air duct 25 is provided in the fluid tube 13 to provide communication between the longitudinal fluid passageway 14 and the nipple section 17.

For controlling the fluid flow from the nipple section 17 to the air communicating passageway 14, a suitable valve 26 is provided, which in the preferred embodiment is a needle valve.

For mounting the needle valve 26 and closing the upper portion of the tubular housing 11, a cap section 27 is provided. The cap section 27 comprises a cap 28 having a bore 29. The bore 29 is partially surrounded by threads 30, and the cooperation between the threads 30 and the threads 15 secures the cap section 27 to the tubular housing 11. The bore 29 of the cap 28 receives the air communicating tube 13. The cap 28 is also provided with a decreased diameter portion 29' having external threads 30' thereon. The threads 30' receive a packing nut 31. The packing nut 31 is provided with suitable internal threads 32 which cooperate with the external threads 30' of the cap 28 to secure the packing nut 31 to the cap 28. The packing nut 31 is provided with a bore 33. A stem 35 of the needle valve 26 is received by the bore 33 and has a threaded portion 36 thereon which cooperates with the threads 34 of the cap 28 to enable the stem 35 to be movably adjusted to control the fluid flow from the nipple section 17 to the air tube 13. The stem 35 extends into the communicating fluid passageway 14. A suitable knurled knob is provided for the needle valve 26 to adjust the position of the stem 35. It is noted that the nipple section 17, needle valve 26 and cap section 27 are secured at one extremity of the tubular housing 11.

According to the invention, at the other extremity of the tubular housing 11 is secured a drive or rotor housing 37. For securing the drive or body housing 37 to the tubular housing 11, suitable means are provided such as a top body plate 38 having a bore 39 therein surrounded by internal threads 40. The bore 39 receives the lower extremity of the air communicating tube 13, and the threads 40 cooperate with the threads 16 to secure the rotor housing 37 to the tubular housing 11.

The body or rotor housing 37 comprising an end plate 41 and a cylinder 42 secured to the top body plate 38 in a suitable manner. The cylinder 42 supports a pair of ball bearings 43 and 44 positioned at opposite ends thereof. The ball bearings 43 and 44 support a drive or rotor shaft 45.

*The end of drive shaft 45 which is supported by bearing 43 has an annular shoulder thereon, clearly shown in Fig. 2, which abuts the inner end of inner race of bearing 43, whereby said bearing serves as a thrust bearing for the drive shaft 45 and the tool supported at the other end of said shaft.*

For rotating the drive shaft 45, a circular rotor or turbine wheel 46 is provided. It is to be noted that the drive shaft and the rotatable axis of the circular rotor or turbine wheel 46 traverses the central longitudinal axis of the tubular housing 11. The turbine wheel 46 is provided with a bore therethrough to receive the drive shaft 45 which is fixedly secured thereto. The circular rotor or turbine wheel 46 is mounted on the other extremity of the tubular housing 11 and has the central rotating axis thereof perpendicular to the longitudinal or central axis of the tubular housing 11 and fluid chamber 13.

The circular rotor or turbine wheel 46, in the preferred embodiment, is constructed with integrally formed radial vanes or teeth 47 upon its periphery, which extend from one end face to the opposite end face of the rotor 46 and are disposed with arcuate configurations concentric with the axis of the rotor 46. Each tooth or vane 47 has maximum width at the midway point of the opposite faces of the rotor 46 and gradually decreases in width as the extremities of the tooth 47 approach the opposite faces to provide a configuration similar in shape to a quarter moon. Ridges or spaces 48 are provided between the vanes and teeth 47 to permit passage of the fluid and to enable rotation by fluid pressure.

For actuating the circular rotor or turbine wheel 46, the drive housing 37 is provided with an intake duct or port 49, communicating or registering with the fluid passageway 14 of the air tube 13. The intake duct or port 49 is positioned at one end of the drive housing 37 and the circular rotor 46 so that the fluid under pressure is directed tangentially against the periphery of the rotor wheel 46.

*As is readily shown in Fig. 2, the end of the rotor or turbine wheel 46, nearest bearing 44, is spaced from the inner face of said ball bearing 44, said space being annular and freely communicating with said ball bearing.*

For discharging the fluid into the outside atmosphere, an exhaust duct or port 50 is provided in the drive housing 37. The exhaust duct 50 is positioned at the other end of the drive housing 37 opposite to the positioning of the intake duct 49.

*As also will be seen from Fig. 2, the end of the turbine wheel nearest ball bearing 43 is spaced from said bearing and this space, being annular, freely communicates with the inner face of said bearing.*

In the preferred embodiment, the drive shaft 45 has a bore 50' surrounded by internal threads 51 to receive a shaft 52 of a work engaging implement 53, such as a grinder or cutter. The shaft has external threads 54 to cooperate with threads 51 to secure the work engaging implement 53 to the drive shaft 45 for rotation therewith. The drive housing 37 also comprises an end plate 55 and a lock washer 56. For protecting the operator from flying objects, a suitable wheel guard 57 is provided, which is secured to the drive housing 37 by suitable means such as a screw 58.

It is to be noted that at the other extremity of the tubular housing 11 is mounted the drive housing 37. The drive housing contains the circular rotor or turbine wheel 46. The turbine wheel or rotor 46 has its central rotating axis perpendicular to the central longitudinal axis of the tubular housing 11. Secured to the rotor 46 is a drive shaft 45 which rotates the work engaging implement 53. Accordingly, the axis of rotation of the work engaging implement 53 is perpendicular to the central longitudinal axis of the tubular housing 11.

In operation, fluid under pressure is received by the nipple section 17 and communicates or registers with the air tube or chamber 13 through the duct 25. The needle valve section 26 controls the flow of fluid under pressure into the fluid passageway 14 of the tube 13. The fluid under pressure travels through the air tube 13 to the lowermost extremity of the tubular housing 11. At the lowermost extremity of the tubular housing 11, the fluid under pressure passes from the air tube 13 to the drive housing 37 through the intake duct 49 of the drive housing. Thereupon, the fluid under pressure engages tangentially the periphery of the rotor or turbine 46 to provide rotation thereof. The rotating of the rotor 46 rotates the drive shaft 45, which in turn drives the work engaging implement 53. The fluid under pressure is discharged to the outside atmosphere through duct 50.

*The fluid which is introduced under pressure to the turbine vanes 47 to rotate the turbine enters the cylinder casing 42 through the intake duct or ducts 49 (which are adjacent space 44). Inasmuch as the fluid, such as air, is introduced under pressure, it will expand upon entering casing 42 and thereby reduce the temperature of the air within said casing.*

*The fluid from intake ducts 49 principally engages the right hand ends of vanes 47 as received in Fig. 2 and is deflected thereby to the left hand ends of said vanes incident to causing rotation of the turbine wheel 46. The fluid discharges from the left hand ends of the spaces 48 between the vanes into the annular space or fluid passage between bearing 43 and the adjacent end of wheel 46 when moving toward exhaust port or ports 50. The fluid expands into said space and freely contacts the races and balls of bearing 43 and cools the same while operating.*

*Further, inasmuch as gases, including air, expand equally and oppositely in all directions, the fluid entering casing 42 through intake ducts 49 engages the vanes 47 near the right hand ends thereof and a certain portion thereof expands and discharges from said right hand ends of the vanes as viewed in Fig. 2, and enters the annular space or fluid passage between said ends of the vanes and bearing 44, expanding somewhat more after doing so. The face of the bearing adjacent said space freely communicates therewith, whereby said bearing is cooled by said expanding fluid.*

*In assembling the tool and particularly the rotor 46 in the cylinder 42 of body housing 37, the inner races of the ball bearing units 43 and 44 respectively are pressed onto opposite ends of the shaft of the rotor, thereby comprising a sub-assembly which is then inserted, as a unit, through the open end of housing 37. The inner end of the interior of housing 37 comprises a seat receiving the outer race of ball bearing unit 43 which seats therein when said sub-assembly is placed within housing 37 and said outer race thereby is held stationary thereby in operation of the tool. The end plate or cover 55 then is fitted over drive shaft 45, said cover having a suitable aperture to receive said shaft. Lock washer 56 then is placed within a suitable annular seat therefor in cylinder 42 and presses against end plate 55 to hold it in engagement with the outer face of the outer race of ball bearing unit 44, thereby holding said outer race stationary and the rotor and ball bearing units, as an assembly, seated in operative position within the body housing 37. The shaft 52 of the implement 53 then is threaded into bore 50' of shaft 45 and the assembly of the head of the tool is complete.*

*It thus will be seen that even though the turbine wheel 46 may rotate at substantial speeds, the fluid under pressure which operates the turbine wheel 46 also effectively maintains bearings 43 and 44 cool during such operation.*

Variations and modifications may be effected without departing from the scope of the appended claims.

I claim:

1. In a fluid actuated rotary tool, a tubular housing providing an elongated handle, a tube extending throughout the entire length of said tubular housing for receiving fluid therethrough, a fluid delivery section mounted on the upper extremity of said tubular housing and communicating with said tube to provide fluid thereto, a valve section mounted on the uppermost extremity of said tubular housing for controlling the flow of fluid from said fluid delivery section to said tube, a drive housing secured to the lowermost extremity of said tubular housing, a rotor mounted in said drive housing, an intake duct in said drive housing communicating with said tube for directing fluid against said rotor for rotation thereof, an exhaust duct in said drive housing for discharging the fluid therein to the outside atmosphere, a drive shaft fixedly secured to said rotor for rotation therewith, and a grinding tool fixedly secured directly to said drive shaft to provide a cutting edge that maintains maximum speed.

2. In a fluid actuated rotary tool, a tubular housing providing an elongated handle and having a centrally disposed longitudinal axis, a tube in said tubular housing for receiving fluid therethrough, a fluid delivery section mounted on the upper extremity of said tubular housing and communicating with said tube to provide fluid thereto, a valve section mounted on the uppermost extremity of said tubular housing for controlling the flow of fluid from said fluid delivery section to said tube, a drive housing secured to the lowermost extremity of said tubular housing, a rotor mounted in said drive housing and having a centrally disposed rotatable axis perpendicular to the longitudinally disposed axis of said tubular housing, transversely arcuate vanes on said rotor for maintaining maximum speeds, an intake duct in said drive housing communicating with said tube for directing fluid against transversely arcuate vanes on said rotor for rotation thereof, an exhaust duct in said drive housing for discharging the fluid therein to the outside atmosphere, a drive shaft fixedly secured to said rotor for rotation therewith, and a grinding tool having a centrally disposed rotatable axis perpendicular to the longitudinally disposed axis of said tubular housing and secured directly to said drive shaft for maintaining maximum speeds, and to provide a rotary tool having a pendulum movement to minimize vibrations.

3. In a fluid actuated rotary tool, a tubular housing having a centrally disposed longitudinal axis, a tube in said tubular housing for receiving fluid therethrough, a fluid delivery section registering with said tubular housing and communicating with said tube to supply fluid, a drive housing mounted on the lowermost extremity of said tubular housing, a rotor having opposite end faces encompassed by said drive housing and having centrally disposed rotatable axis perpendicular to the longitudinally disposed axis of said tubular housing, transversely arcuate vanes integrally formed on said rotor for maintaining maximum speeds, each of said transversely arcuate vanes disposed concentric with the axis of said rotor and having a maximum width at the midway point between the opposite end faces of said rotor and gradually decreasing in width as the extremities thereof approach the opposite end faces of said rotor for reducing fluid turbulence, ridges on said rotor spaced between said vanes to permit the passage of fluid between said vanes, a fluid intake duct in said drive housing communicating with said tube for directing fluid against said transversely arcuate vanes of said rotor for rotation thereof, an exhaust duct in said drive housing for discharging the fluid therein to the outside atmosphere, a drive shaft fixedly secured to said rotor for rotation therewith, and a work engaging implement fixedly secured to said drive shaft and having centrally disposed rotatable axis perpendicular to the longitudinally disposed axis of said tubular housing to provide a rotary tool having a pendulum balance to minimize vibrations.

4. In a fluid actuated rotary tool, a tubular housing, a tube in said tubular housing for receiving fluid therethrough, a fluid delivery section registering with said tubular housing and communicating with said tube to supply fluid, a drive housing mounted on the lowermost extremity of said tubular housing, a rotor having opposite end faces encompassed by said drive housing and having centrally disposed rotatable axis, transversely arcuate vanes integrally formed on said rotary, each of said transversely arcuate vanes disposed concentric with the axis of said rotor and having a maximum width at the midway point between the opposite end faces of said rotor and gradually decreasing in width as the extremities thereof approach the end faces of said rotor for reducing fluid turbulence, ridges on said rotor spaced between said vanes to permit the passage of fluid between said vanes, a fluid intake duct in said drive housing communicating with said tube for directing fluid against said transversely arcuate vanes on said rotor for rotation thereof, an exhaust duct in said drive housing for discharging the fluid to the outside atmosphere, a drive shaft fixedly secured to said rotor for rotation therewith, and a work engaging implement fixedly secured to said drive shaft to provide a rotary tool.

*5. A fluid actuated rotary tool for grinding or cutting comprising, a handle having a fluid passageway therethrough, a housing fixed to one end of said handle, said housing having an exhaust opening and having a fluid inlet opening communicating with said passageway, bearings in said housing adjacent opposite ends thereof, a turbine rotor having radial vanes thereon mounted on a shaft rotatably supported in said bearings with said rotor located between said bearings and the vanes of said rotor extending substantially axially of said rotor, the opposite ends of said vanes respectively being positioned opposite said bearings in an axial direction and said fluid inlet opening being positioned intermediately of the ends of said vanes and directed tangentially toward the same, whereby fluid engaging the vanes of said rotor to drive the same is deflected for discharge from the opposite ends of said vanes directly onto both of said bearings, and a work engaging implement secured to said shaft to provide a rotary tool for grinding and cutting.*

*6. A fluid actuated rotary tool for grinding and cutting comprising, a handle having a fluid passageway therethrough, a housing fixed to one end of said handle, said housing having an exhaust opening and having a fluid inlet opening communicating with said passageway, radial anti-friction bearings in said housing adjacent opposite ends thereof, said bearings comprising inner and outer races having anti-friction members therebetween, a turbine rotor mounted on a shaft and having generally axially extending vanes thereon, said shaft being fixed relative to the inner races and thereby rotatably supported in said bearings, the vanes of said rotor extending between said bearings in an axial direction and the ends of said vanes respectively being positioned opposite said bearings in an axial direction and spaced therefrom, whereby fluid engaging said rotor to drive the same discharges from the opposite ends of said vanes directly onto both of said bearings, the outer races of said bearings being fixed relative to said housing, and a work engaging implement secured to said shaft to provide a rotary tool for grinding and cutting.*

*7. A fluid actuated rotary tool for grinding or cutting comprising, a handle having a fluid passageway therethrough, a housing fixed to one end of said handle, said housing having an exhaust opening and having a fluid inlet opening communicating with said passageway, bearings in said housing adjacent opposite ends thereof, a turbine rotor mounted on a shaft between said bearings and having radial vanes thereon extending substantially axially thereof, the opposite ends of said vanes being positioned opposite said bearings in an axial direction, said shaft being rotatably supported adjacent the end portions thereof respectively in said bearings with one end of said shaft projecting axially outwardly beyond one of said bearings and having an axial bore therein, said fluid inlet opening being positioned intermediately the ends of said vanes and directed tangentially toward the same, whereby fluid engaging the vanes of said rotor to drive the same is deflected by said vanes for discharge from the opposite ends of the vanes directly onto both of said bearings, and a work engaging implement received within the bore in said projecting end of said shaft to provide a rotary tool for grinding and cutting.*

*8. A fluid actuated rotary tool for grinding and cutting comprising, a handle having a fluid passageway therethrough, a housing fixed to one end of said handle, said housing having an exhaust opening and having a fluid inlet opening communicating with said passageway, anti-friction bearings in said housing adjacent opposite ends thereof, and a cylindrical turbine rotor having circumferentially spaced spaces extending radially inward from the periphery of said rotor and longitudinally thereof to provide radial vanes thereof, said rotor being mounted on a shaft rotatably supported in said bearings with said rotor located between said bearings, the ends of said rotor being spaced from the inner faces of said bearings and the opposite ends of said spaces between said vanes respectively being positioned opposite said bearings in an axial direction, said fluid inlet opening being positioned intermediately of the ends of said vanes and directed tangentially toward the same, whereby fluid engaging the vanes of said rotor to drive the same is deflected and discharges from the opposite ends of the spaces between said vanes in an axial direction into said spaces and directly onto both of said bearings, and a work engaging implement secured to said shaft to provide a rotary tool for grinding and cutting.*

*9. A fluid actuated rotary tool for grinding and cutting comprising, a handle having a fluid passageway therethrough, a housing fixed to one end of said handle and having a seat in one end thereof and an opening in the other end thereof, said housing also having an exhaust opening and having a fluid inlet opening communicating with said passageway; a turbine rotor assembly positionable within said housing by axial insertion through said opening in one end of said housing, said rotor assembly comprising a substantially cylindrical rotor mounted upon a shaft, said rotor having radial vanes thereon extending substantially axially thereof, anti-friction bearings connected to said shaft adjacent opposite ends of said rotor and the opposite ends of said vanes respectively being positioned opposite said bearings in an axial direction, one bearing of said rotor assembly being positioned within the seat in said one end of said housing when said assembly is mounted within said housing and said fluid inlet opening being positioned intermediately of the ends of said vanes and directed tangentially toward the same, whereby fluid engaging the vanes of said rotor to drive the same is deflected for discharge from the opposite ends of said vanes directly onto both of said bearings; and a work engaging implement secured to said shaft to provide a rotary tool for grinding and cutting.*

*10. A fluid actuated rotary tool for grinding and cutting comprising, a handle having a fluid passageway therethrough, a housing fixed to one end of said handle and having a seat in one end thereof and an opening in the other end thereof, said housing also having an exhaust opening and having a fluid inlet opening communicating with said passageway; a turbine rotor assembly positionable within said housing by axial insertion through said opening in one end of said housing, said rotor assembly comprising a substantially cylindrical rotor mounted upon a shaft, said rotor having radial vanes thereon extending substantially axially thereof, anti-friction bearings connected to said shaft adjacent opposite ends of said rotor and the opposite ends of said vanes respectively being positioned opposite said bearings in an axial direction, one bearing of said rotor assembly being positioned within the seat in said one end of said housing when said assembly is mounted within said housing and said fluid inlet opening being positioned intermediately of the ends of said vanes and directed tangentially toward the same, whereby fluid engaging the vanes of said rotor to drive the same is deflected for discharge from the opposite ends of said vanes directly onto both of said bearings; a cover for said opening in the other end of said housing to secure said turbine assembly operatively therein, said anti-friction bearings including concentric inner and outer races with anti-friction rotating members therebetween and said cover and seat serving to secure the outer races of said bearings stationary with-*

*in said housing; and a work engaging implement secured to said shaft to provide a rotary tool for grinding and cutting.*

References Cited in the file of this patent or the original patent

UNITED STATES PATENTS

| | | |
|---|---|---|
| 691,740 | Birkenstock | Jan. 22, 1902 |
| 983,988 | Foster et al. | Feb. 14, 1911 |
| 1,270,808 | Franklin | July 2, 1918 |
| 1,313,842 | Tridico | Aug. 19, 1919 |
| 1,412,400 | Gasser | Apr. 11, 1922 |

| | | |
|---|---|---|
| 1,595,388 | Elliott | Aug. 10, 1926 |
| 2,000,930 | De Nagy | May 10, 1935 |
| 2,045,980 | De Nagy | June 30, 1936 |
| 2,408,280 | Wilcox | Sept. 24, 1946 |
| 2,570,009 | Schmid | Oct. 2, 1951 |
| 2,602,632 | Serduke et al. | July 8, 1952 |
| 2,702,093 | Sherrill | Feb. 15, 1955 |
| 2,709,567 | Wood | May 21, 1955 |
| 2,777,152 | Cosentino | Jan. 15, 1957 |

OTHER REFERENCES

Journal of the American Dental Association, vol. 47, September 1953, pp. 324–329.